United States Patent
Hanlon et al.

(10) Patent No.: US 8,229,943 B2
(45) Date of Patent: Jul. 24, 2012

(54) SYSTEM AND METHOD FOR MODIFYING AN EXECUTING QUERY

(75) Inventors: Michael J. Hanlon, Austin, TX (US); Anoop Sharma, San Jose, CA (US); Subbarao Kakarlamudi, Milpitas, CA (US); Selvaganesan Govindarajan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 96 days.

(21) Appl. No.: 12/868,895

(22) Filed: Aug. 26, 2010

(65) Prior Publication Data

US 2012/0054215 A1     Mar. 1, 2012

(51) Int. Cl.
*G06F 7/00*     (2006.01)
*G06F 17/30*    (2006.01)

(52) U.S. Cl. ............... 707/759; 707/803; 707/E17.014; 707/E17.069; 707/E17.075; 709/223; 709/246; 715/220; 715/788; 715/968; 370/469; 370/424; 370/413

(58) Field of Classification Search .................. 707/718, 707/759, 769, 758, 803, E17.014, E17.069, 707/E17.075; 709/223, 246; 715/220, 788, 715/968; 370/469, 424, 413
See application file for complete search history.

(56) References Cited

U.S. PATENT DOCUMENTS

| | | | | |
|---|---|---|---|---|
| 5,423,038 A * | 6/1995 | Davis | ......................... | 715/751 |
| 6,167,253 A * | 12/2000 | Farris et al. | ................ | 455/412.2 |
| 6,314,501 B1 * | 11/2001 | Gulick et al. | ................ | 711/153 |
| 6,778,491 B1 * | 8/2004 | Fourcand et al. | ............ | 370/217 |
| 6,826,175 B1 * | 11/2004 | Gammenthaler et al. | .... | 370/352 |
| 7,737,517 B2 * | 6/2010 | Kawamura et al. | ........... | 257/432 |
| 2004/0103416 A1 * | 5/2004 | Orton et al. | .................... | 719/328 |
| 2005/0021713 A1 * | 1/2005 | Dugan et al. | .................. | 709/223 |
| 2006/0069702 A1 * | 3/2006 | Moeller et al. | ................ | 707/200 |
| 2010/0281458 A1 * | 11/2010 | Paladino et al. | ...... | 707/E17.108 |
| 2011/0212711 A1 * | 9/2011 | Scott | ......................... | 455/414.2 |
| 2011/0213859 A1 * | 9/2011 | Greene et al. | ................. | 709/218 |

OTHER PUBLICATIONS

Carlos Ordonez and Edward Omiecinski—"Efficient Disk-Based K-Means Clustering for Relational Databases"—IEEE Transactions on Knowledge and Data Engineering, vol. 16, No. 8, Aug. 2004 (pp. 909-921).*

Ymir Vigfusson, Adam Silberstein, Brian F. Cooper and Rodrigo Fonseca—"Adaptively Parallelizing Distributed Range Queries" -VLDB '09, Aug. 24-28, 2009, Lyon, France, Copyright 2009 VLDB Endowment, ACM—Proceedings of the VLDB Endowment, vol. 2 Issue 1, (pp. 682-693).*

David Sitsky and Kenichi Hayashi—"an MPI Library which uses Polling, Interrupts and Remote Copying for the Fujitsu AP1000+"—Second International Symposium on Parallel Architectures, Algorithms, and Networks, 1996. Proceedings. Second International Symposium on (pp. 43-49).*

\* cited by examiner

*Primary Examiner* — John E Breene
*Assistant Examiner* — Anh Ly

(57) ABSTRACT

There is provided a computer-implemented method of modifying a query executing in a database management system. The method comprises sending a no-wait message for the query to a control broker. The method also comprises receiving a reply to the no-wait message from the control broker. The reply to the no-wait message specifies a modification to the query. Additionally, the method comprises performing the modification.

17 Claims, 5 Drawing Sheets

SYSTEM AND METHOD FOR MODIFYING AN EXECUTING QUERY

BACKGROUND

A workload monitor needs the ability to interrupt and modify a query in progress. Some examples of query modification include canceling the query, suspending the query, changing a query's priority, and reconfiguring the use of virtual memory.

In an operating system that supports multi-threading, one thread can be blocking in a database management system library call to execute the query. At the same time, another thread may monitor connections from clients for new messages, such as requests to interrupt the query. To process this kind of message, the receiving thread can use memory shared with the executing thread to communicate the specific type of interruption requested, for example, to cancel the query.

In an operating system that supports signaling, a monitor process may send a signal to the database management system library executing the query. The database management system library may temporarily install a special signal handler while the query to be modified is executing. This signal handler may terminate the database management system library's wait for the completion of the query.

Alternatively, the signal handler may set a flag that can be accessed by the database management system library. A specially configured database management system library can then use regularly scheduled timeouts to check the flag. However, some operating systems do not fully support signals with all types of processes.

Unfortunately, the signal does not contain information about what modification to perform to the query. As such, the signal handler may not be flexible enough to modify queries without additional transactions to determine the type of modification being requested.

In a message-based, massively parallel operating system, a database connectivity server may execute the query using a call to a database management system library application program interface. The call to the library application program interface may not return until results of the query are available.

During the time the call is blocked, most of the query processing is performed by database management system server processes. While the server processes are working, the library may be stuck in an I/O wait loop. It is not uncommon for several minutes to elapse before results of a query are available and the library call unblocks.

In this environment, the modification of an executing query may be challenging. The database connectivity server remains blocked in the library and may not respond to a message received from the workload monitor, even if the workload monitor is a client of the database connectivity server. The library also may not take messages from any of the database connectivity server's clients, because the client connections are owned by the database connectivity server.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Figure 1:
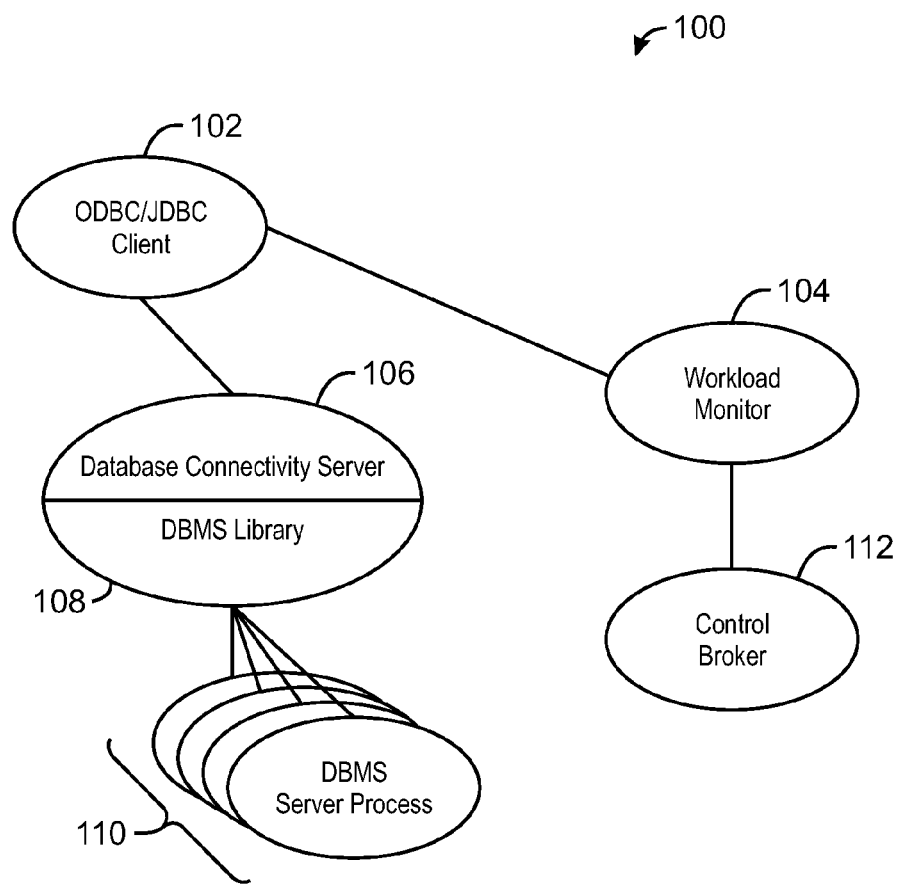
FIG. 1 is a block diagram of a database management system runtime environment according to an embodiment of the present invention.

FIG. 1 is a block diagram of the database management system runtime environment 100 according to an embodiment of the present invention. The database management system runtime environment 100 of an SQL database management system with a massively parallel, share-nothing, message-based operating system may be implemented as a cluster of server processes 110.

A query submitted for execution database management system runtime environment 100 may be executed as one or more of the cluster of server processes 110. Typically, the cluster of server processes 110 execute in multiple processors to take advantage of the efficiencies of parallel processing.

The cluster of server processes 110 may be controlled by a master process. The master process can be considered an application. Many types of applications can execute on the database management system host platform. One type of application is a database connectivity server 106.

A common interface of the database connectivity server 106 to the database management system is through a library of functions. The database management system library 108 owns and manages its connections to the cluster of server processes 110 implementing the runtime environment.

The database connectivity server 106 owns and manages the connections to its clients. Clients of the database connectivity server 106 include open database connectivity and java database connectivity client applications 102 and a workload monitor 104.

The workload monitor 104 may be rules-based software that monitors the health of the database management system. The workload monitor 104 may provide a user interface to a user describing the health of the database management system.

In an embodiment of the invention, the open database connectivity and java database connectivity client applications 102 and the workload monitor 104 may submit requests to a control broker 112. The requests may include requests to modify queries executing in the database management system runtime environment 100.

The control broker 112 may be a persistent process, external to the database management system, which is accessible through messaging. The control broker 112 may facilitate communication between clients and the database management system library 108. The control broker 112 may reply to messages from the database management system library 108. The reply may include a "payload" from the request to modify queries.

The payload may specify the particular request type, such as canceling the query, suspending the query, changing the query's priority, changing the semantics of the query, and the like. In response to receiving the reply from the control broker 112, the database management system library 108 may modify the query in accordance with the request.

Figure 2:
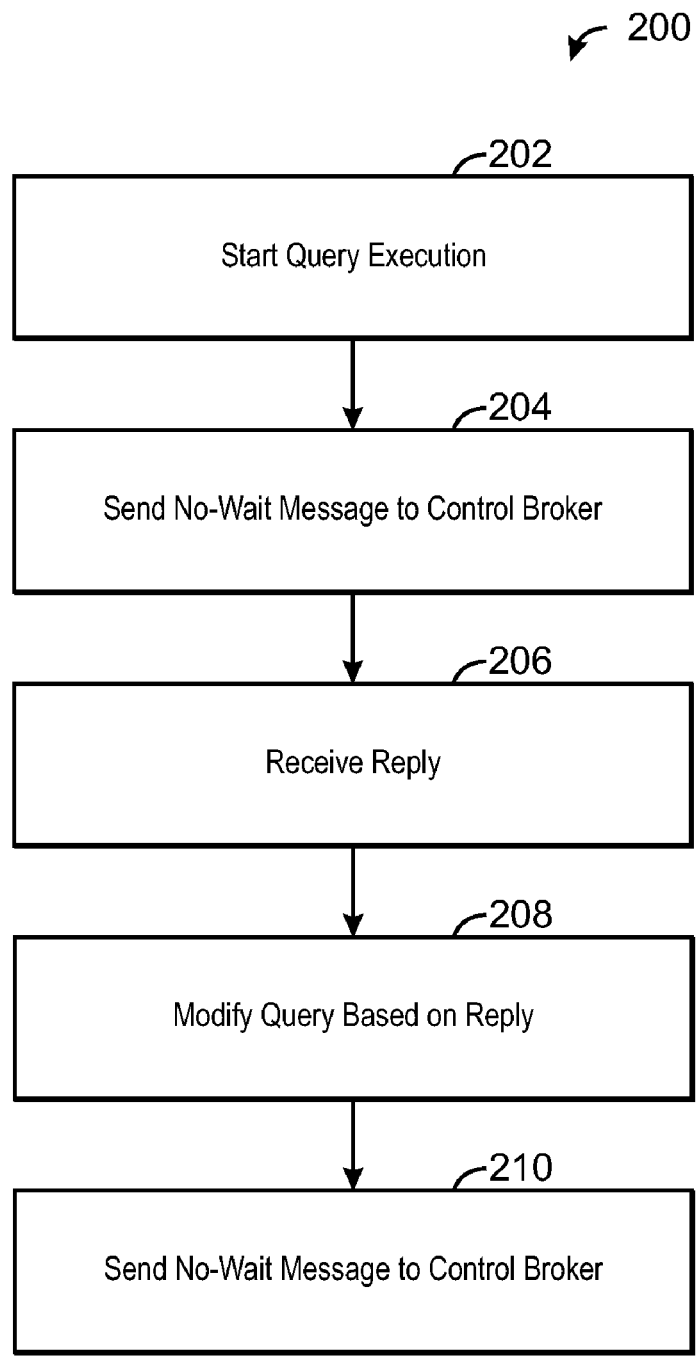
FIG. 2 is a process flow diagram showing a computer-implemented method for modifying an executing query according to an embodiment of the present invention.

FIG. 2 is a process flow diagram showing a computer-implemented method for modifying an executing query according to an embodiment of the present invention. The method is generally referred to by the reference number 200, and may be performed by the database management system library 108. It should be understood that the process flow diagram is not intended to indicate a particular order of execution.

The method 200 begins at block 202, where the database management system library 108 may start execution of the query. Execution of the query may include the initiation of one or more of the cluster of server processes 110.

At block 204, the database management system library 108 may send a no-wait message to the control broker 112. By sending a message to the control broker 112, the database management system library 108 may effectively permit the control broker 112 to interrupt the database management system library's I/O wait loop by replying to the message. In an embodiment of the invention, the no-wait message may specify an identifier for the query. The no-wait message may also specify that the query is started.

At block 206, the database management system library 108 may receive the reply to the no-wait message from the control broker 112. In an embodiment of the invention, the reply may specify the identifier of the query. The reply may also include a payload that specifies a modification to the query.

At block 208, the database management system library 108 may modify the query based on the payload of the reply. As stated previously, the modification may be a cancellation, suspension, or a change in priority of the query.

At block 210, the database management system library 108 may send a no-wait message to the control broker 112, to indicate that the query continues and to allow further modification of the query.

Advantageously, embodiments of the invention may enable the database management system library 108 to cancel the query instead of having an operating system cancel the query. Using operating system functions, the query is canceled through the stopping of one or more of the cluster of server processes 110.

However, in such a scenario, it may be difficult to properly report that a query has been canceled because the database management system library 108 may experience the stopping of database management system server processes for myriad reasons. The database management system library 108 cannot assume that a stopped server process 110 is due to cancellation of the query. As a result, general error messages may be reported for the canceled query.

Further, subsequent use of the database management system library 108 may entail the overhead of new process creation for the database connectivity server 106 and database management system server processes 110, and suffer the loss of caches managed by the these processes 106, 110. If several queries share the database connectivity server processes 106, the cancellation of the query may impact the other queries.

In contrast, by having the database management system library 108 cancel the query, a more orderly cancellation may take place by using the database management system library's existing exception handling to report correctly that the query has been canceled. In addition, the database management system library 108 and server processes 110 may execute clean-up code to prepare for a next query.

As such, shared server process 106 and 110 and corresponding caches can survive a query cancelled by the database management system library 108. When other queries share server processes 106 and 110 with the cancelled query, the other queries may be unaffected by the cancellation.

Figure 3:
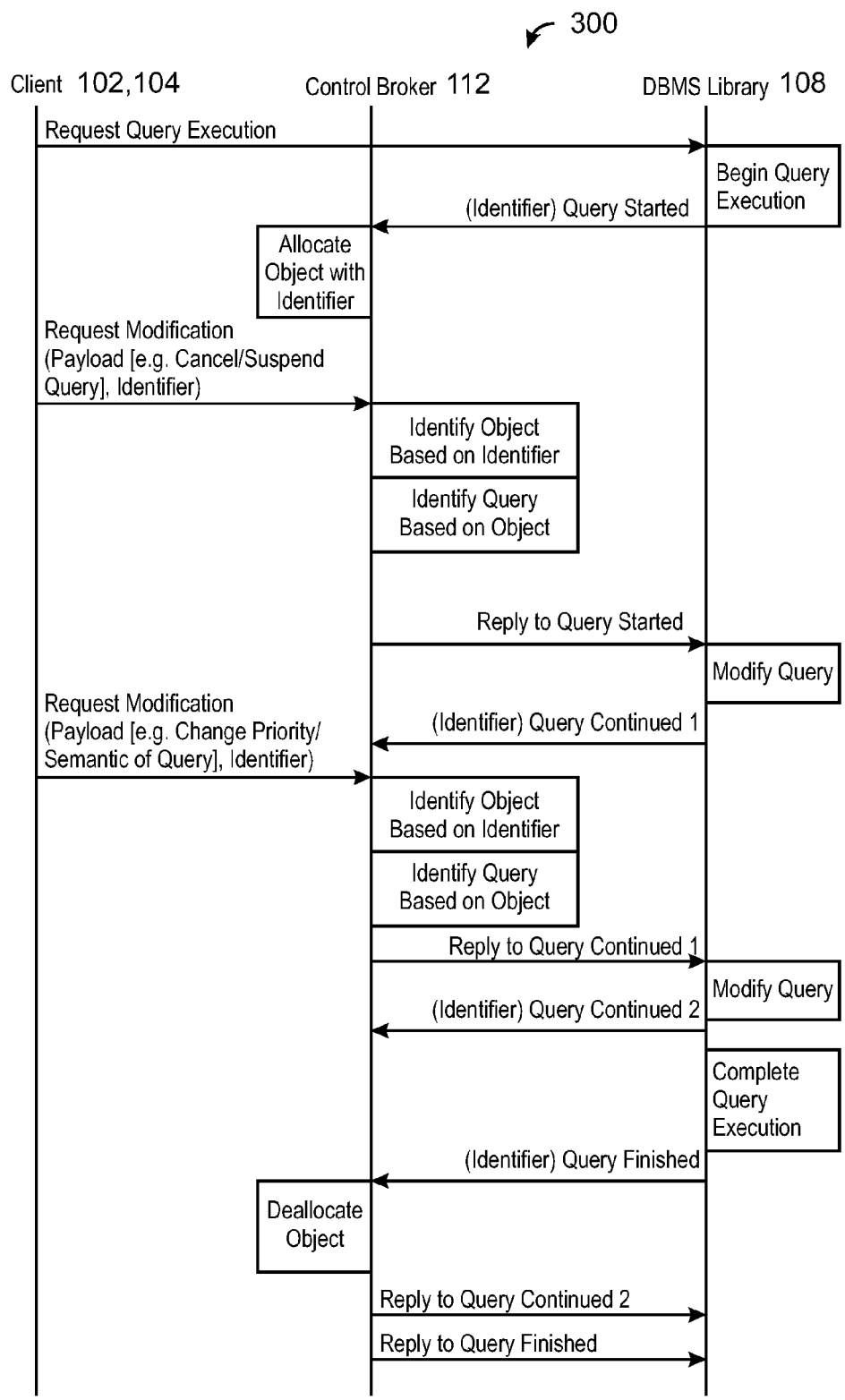
FIG. 3 is a message flow diagram of a system for modifying an executing query according to an embodiment of the present invention.

FIG. 3 is a message flow diagram of a system for modifying an executing query according to an embodiment of the present invention. The database management system library 108 may receive a request to execute a query. In response to receiving the request, the database management system library 108 may begin execution of the query. Additionally, the database management system library 108 may send a "QUERY STARTED" message to the control broker 112. The "QUERY STARTED" message may specify an identifier of the query.

In response to receiving the "QUERY STARTED" message, the control broker 112 may allocate an object. The newly allocated object may contain the identifier specified in the "QUERY STARTED" message.

At some point during execution of the query, the control broker 112 may receive a "REQUEST MODIFICATION" message from a client, such as the workload monitor 104. The "REQUEST MODIFICATION" message may include a payload that specifies the type of modification being requested. The identifier of the query to be modified may also be included.

In an embodiment of the invention, the control broker 112 may receive "QUERY STARTED" messages for multiple queries. As such, in response to receiving the "REQUEST MODIFICATION" message, the control broker 112 may identify the object that was allocated for the query based on the identifier in the "REQUEST MODIFICATION" message. The control broker 112 may then identify the query to be modified based on the object.

The control broker 112 may then reply to the "QUERY STARTED" message, originally sent from the database management system library 108. The reply may include the payload from the "REQUEST MODIFICATION" message. In response to receiving the reply, the database management system library 108 may modify the query based on the payload in the reply.

In an embodiment of the invention, multiple modifications of an executing query may be performed. As such, the database management system library 108 may send a no-wait "QUERY CONTINUED 1" message to the control broker 112. The "QUERY CONTINUED 1" message may allow the control broker 112 to re-interrupt the database management system library's I/O wait loop.

As shown, the control broker 112 may receive a second "REQUEST MODIFICATION" message specifying the type of modification and the identifier of the query. The control broker 112 may then identify the allocated object based on the identifier, and identify the query based on the object. The database management system library 108 may then perform the requested modification, and send a no-wait "QUERY CONTINUED 2" message for further potential modifications.

In the scenario where the modification requested is to cancel the query, no further modification may occur. As such, the database management system library 108 may not send a no-wait "QUERY CONTINUED 2" message if the query is cancelled.

When the query finishes executing, the database management system library 108 may send a "QUERY FINISHED" message, specifying the query identifier, to the control broker 112. In response to receiving the "QUERY FINISHED" message, the control broker 112 may de-allocate the object associated with the query. The control broker 112 may also reply to any outstanding messages from the database management system library 108, such as the "QUERY CONTINUED" and "QUERY FINISHED" messages.

Figure 4:
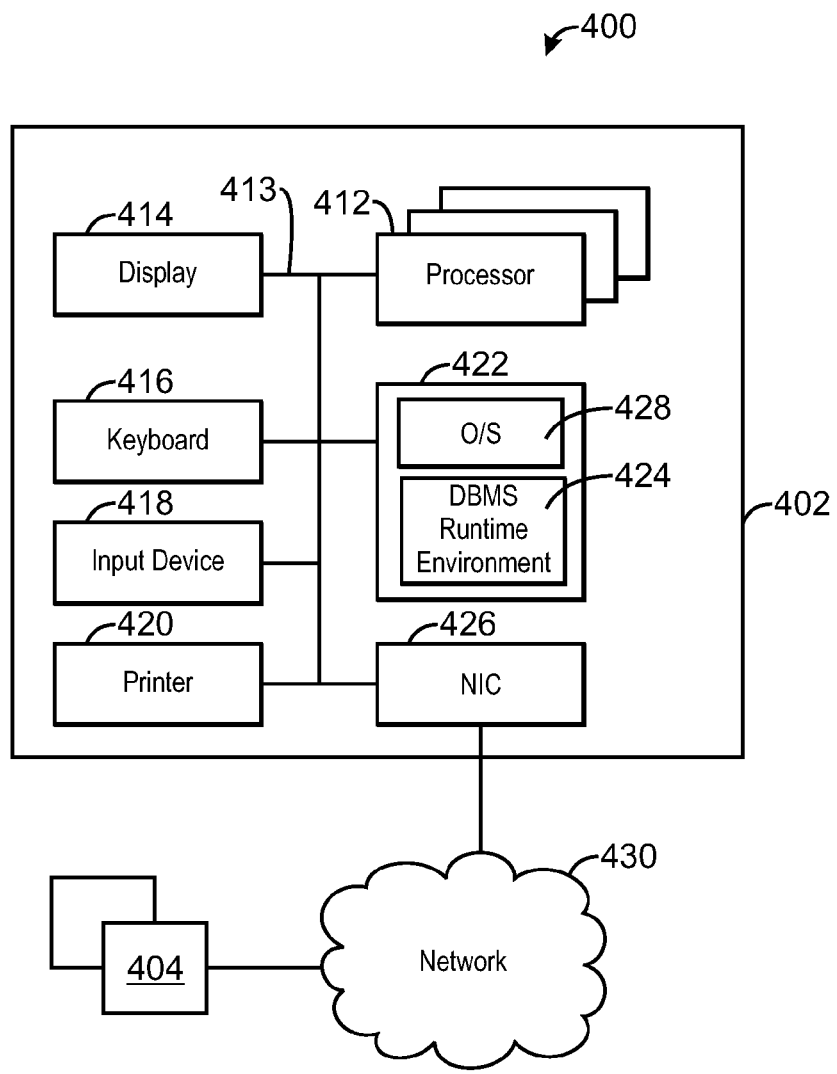
FIG. 4 is a block diagram of a system for modifying an executing query according to an embodiment of the present invention.

FIG. 4 is a block diagram of a system for modifying an executing query according to an embodiment of the present invention. The system is generally referred to by the reference number 400. Those of ordinary skill in the art will appreciate that the functional blocks and devices shown in FIG. 4 may comprise hardware elements including circuitry, software elements including computer code stored on a non-transitory, machine-readable medium or a combination of both hardware and software elements.

Additionally, the functional blocks and devices of the system 400 are but one example of functional blocks and devices that may be implemented in an embodiment of the present invention. Those of ordinary skill in the art would readily be able to define specific functional blocks based on design considerations for a particular electronic device.

The system 400 may include a database server 402, and one or more client computers 404, in communication over a network 430. In an embodiment of the invention, the database server 402 may be a massively-parallel, shared-nothing computing system.

As shown, the database server 402 may include one or more processors 412, which may be connected through a bus 413 to a display 414, a keyboard 416, one or more input devices 418, and an output device, such as a printer 420. The input devices 418 may include devices such as a mouse or touch screen.

The database server 402 may also be connected through the bus 413 to a network interface card 426. The network interface card 426 may connect the database server 402 to the network 430. The network 430 may be a local area network, a wide area network, the Internet, or another network configuration. The network 430 may include routers, switches, modems, or any other kind of interface device used for interconnection.

The database server 402 may have other units operatively coupled to the processor 412 through the bus 413. These units may include non-transitory, machine-readable storage media, such as a storage 422. The storage 422 may include media for the long-term storage of operating software and data, such as hard drives.

The storage 422 may also include other types of non-transitory, machine-readable media, such as read-only memory and random access memory. The storage 422 may include the software used in embodiments of the present techniques. In an embodiment of the invention, the storage 422 may include a database management system runtime environment 424 and an operating system 428.

The operating system 428 may be software that manages the way different programs use the hardware of the database server 402. Further, the operating system 428 may regulate the ways that a user controls the database server 402. In an embodiment of the invention, the operating system 428 may be a message-based operating system for a massively parallel, shared-nothing computer system.

The database management system runtime environment 424 may be a set of computer programs that controls the creation, maintenance, and use of databases by an organization and its end users. Through the network 430, several client computers 404 may connect to the database server 402.

The client computers 404 may be similarly structured as the database server 402, with exception to the storage of the database management system runtime environment 424. Additionally, the client computers 404 may be used to submit a query to be executed in the database management system runtime environment 424.

Figure 5:
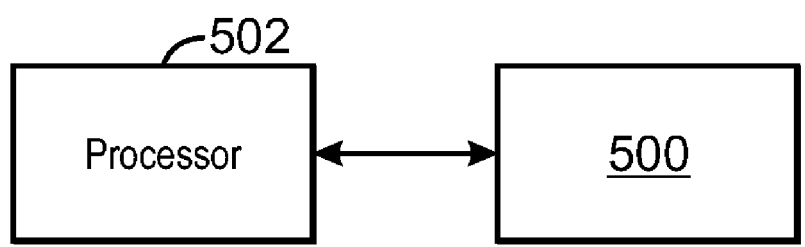
FIG. 5 is a block diagram showing a non-transitory, machine-readable medium that stores code for modifying an executing query according to an embodiment of the present invention.

FIG. 5 is a block diagram showing a non-transitory, machine-readable medium that stores code for modifying an executing query according to an embodiment of the present invention. The non-transitory, machine-readable medium is generally referred to by the reference number 500.

The non-transitory, machine-readable medium 500 may correspond to any typical storage device that stores computer-implemented instructions, such as programming code or the like. For example, the non-transitory, machine-readable medium 500 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

A processor 502 generally retrieves and executes the instructions stored in the non-transitory, machine-readable medium 500 to modify an executing query. A no-wait message may be received for the query. An object may be allocated to track the query. A request to perform a modification to the query may be received. A reply to the no-wait message may be sent, based on the request and the object. The modification to the query may be performed.

What is claimed is:

1. A computer-implemented method of modifying a query executing in a database management system (DBMS), comprising:
    sending, by the DBMS, a no-wait message for the query to a control broker, wherein the no-wait message permits the control broker to interrupt the DBMS by replying to the no-wait message;
    receiving, by the DBMS, a reply to the no-wait message from the control broker, wherein the reply to the no-wait message specifies a modification to the query; and
    performing, by the DBMS, the modification, wherein the modification is one of
        a cancellation of the query;
        a suspension of the query;
        a change in priority of the query; and
        a change in a semantic of the query.

2. The method recited in claim 1, wherein the reply is sent by the control broker in response to a request from a client to modify the query, and wherein the no-wait message comprises an identifier for the query, and wherein the request comprises the identifier.

3. The method recited in claim 2, further comprising:
    allocating, by the control broker, an object that comprises the identifier; and
    sending, by the control broker, the reply to the no-wait message based on the object.

4. The method recited in claim 2, further comprising:
    sending, by the DBMS, a second no-wait message to the control broker that specifies the query is finished;
    de-allocating, by the control broker, the object in response to receiving the second no-wait message; and
    sending, by the control broker, a reply to the second no-wait message.

5. The method recited in claim 2, wherein the client is one of:
    a workload monitor that monitors a health of the DBMS;
    a java database connectivity client; and
    an object database connectivity client.

6. The method recited in claim 5, further comprising:
sending, by the DBMS, a second no-wait message for the query to the control broker;
receiving, by the DBMS, a reply to the second no-wait message from the control broker, wherein the reply to the second no-wait message specifies a second modification to the query; and
performing, by the DBMS, the second modification to the query.

7. The method recited in claim 1, wherein the control broker is a persistent process that is external to the DBMS.

8. A computer system for modifying a query executing in a database management system (DBMS), the computer system comprising:
at least one processor; and
at least one memory comprising instructions that, when executed by the at least one processor, cause the computer system to
receive a no-wait message for the query, wherein the no-wait message permits the computer system to interrupt the DBMS by replying to the no-wait message;
allocate an object to track the query;
receive a request to perform a modification to the query;
identify the query based on the request; and
send a reply to the no-wait message, wherein the reply is sent to the identified query, and wherein the reply specifies the modification, and wherein the modification is one of
a cancellation of the query;
a suspension of the query;
a change in priority of the query; and
a change in a semantic of the query.

9. The computer system recited in claim 8, wherein the no-wait message specifies an identifier for the query, and wherein the object comprises the identifier, and wherein the request specifies the identifier.

10. The computer system recited in claim 9, wherein the at least one memory comprises further instructions that, when executed by the at least one processor, cause the computer system to
identify the object based on the identifier; and
identify the query based on the object.

11. The computer system recited in claim 8, wherein the at least one memory comprises further instructions that, when executed by the at least one processor, cause the computer system to
receive a second no-wait message that specifies the query is finished;
de-allocate the object in response to receiving the second no-wait message; and
send a reply to the second no-wait message.

12. The computer system recited in claim 8, wherein the request is received from a client.

13. The computer system recited in claim 12, wherein the client is one of:
a workload monitor that monitors a health of the DBMS;
a java database connectivity client; and
an object database connectivity client.

14. The computer system recited in claim 8, wherein the at least one memory comprises further instructions that, when executed by the at least one processor, cause the computer system to
receive a second no-wait message that specifies a second modification to the query;
send a reply to the second no-wait message, wherein the reply to the second no-wait message specifies the second modification; and
perform the second modification to the query.

15. A non-transitory, machine-readable medium that stores machine-readable instructions that, when executed by a processor, cause a device to:
receive a no-wait message for a query, wherein the no-wait message permits the device to interrupt a DBMS by replying to the no-wait message;
allocate an object to track the query;
receive a request to perform a modification to the query;
send a reply to the no-wait message based on the request and the object; and
perform the modification to the query, wherein the modification is one of
a cancellation of the query;
a suspension of the query;
a change in priority of the query; and
a change in a semantic of the query.

16. The non-transitory, machine-readable medium of claim 15, comprising further machine-readable instructions that, when executed by the processor, cause the device to:
receive a second no-wait message that specifies the query is finished; and
de-allocate the object in response to receiving the second no-wait message.

17. The non-transitory, machine-readable medium of claim 15, comprising further machine-readable instructions that, when executed by the processor, cause the device to:
receive a second no-wait message that specifies a second modification to the query;
send a reply to the second no-wait message, wherein the reply to the second no-wait message specifies the second modification; and
perform the second modification to the query.

* * * * *